United States Patent Office
3,631,014
Patented Dec. 28, 1971

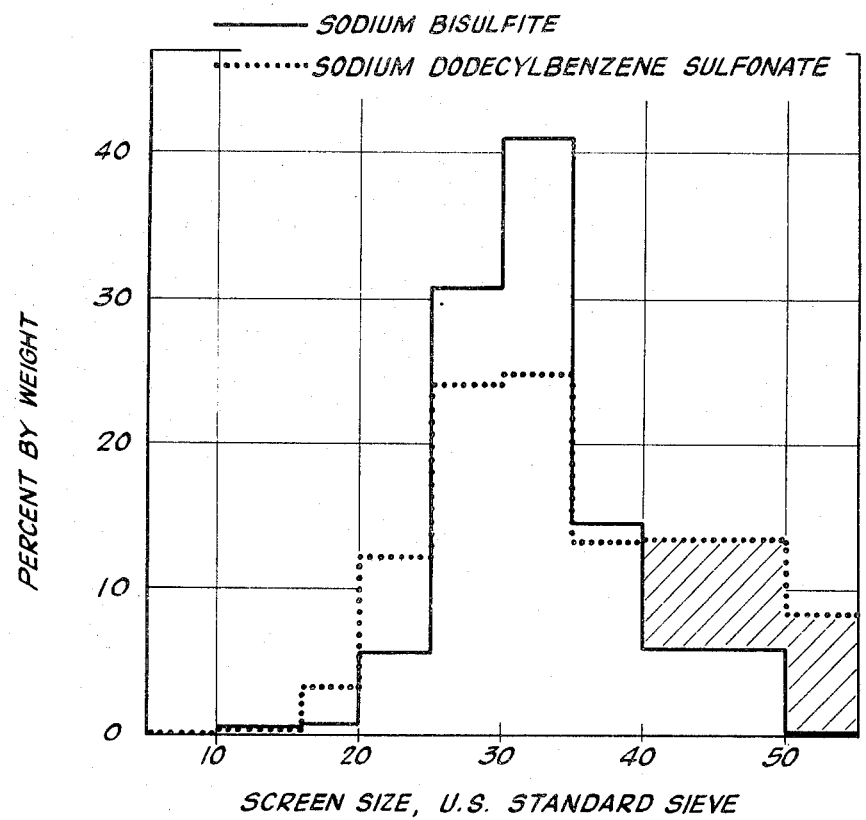

3,631,014
SUSPENSION POLYMERIZATION PROCESS
Harold A. Wright, Murrysville, Pa., assignor to
Sinclair-Koppers Company
Continuation-in-part of application Ser. No. 641,596,
May 26, 1967. This application Oct. 14, 1969, Ser.
No. 868,286
Int. Cl. C08f 1/11, 7/04
U.S. Cl. 260—93.5 W
4 Claims

ABSTRACT OF THE DISCLOSURE

The production of polymer particles or beads by suspending, as droplets, a vinyl aromatic monomer having a free radical generating catalyst dissolved therein, in an aqueous medium with the aid of a finely divided phosphate suspending agent and heating the suspension to cause the monomer to polymerize into polymer particles is improved by adding to the suspension at least about 0.0003 percent by weight based on monomer of sodium bisulfite to the suspension before the droplets reach the bead identity point.

CROSS REFERENCES TO RELATED APPLICATIONS

This application is a continuation-in-part of my co-pending applications, Ser. No. 641,596, filed May 26, 1967 now abandoned.

BACKGROUND OF THE INVENTION

Free radical initiators particularly peroxidic initiators, such as benzoyl peroxide, are commonly used as the primary initiator in the suspension polymerization of vinyl aromatic monomers such as styrene. These initiators, being predominantly oil soluble and water insoluble are believed to react within the monomer droplets (beads) to cause the polymerization in the following manner:

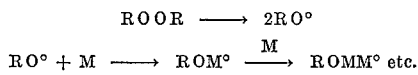

In some instances, the decomposition of the peroxide is accomplished by thermal energy; and consequently, the rate of generation of free radicals and the ensuing polymerization reaction rate (and the molecular weight of the polymer produced) are governed by the temperature at which the reaction is carried out. In other instances the catalyzation of the polymerization of vinyl aromatic monomers by an oil-soluble oxygen liberating catalyst has been promoted by the use of sodium bisulfite where its catalytic effect is, in fact, so pronounced that it will promote the emulsion polymerization of styrene in combination with ammonium perdisulfate which in itself is ineffective to polymerize styrene under the same conditions; Cf. Brubaker et al. 2,462,354. This promoter or catalytic effect of sodium bisulfite in combination with an oil-soluble oxygen liberating catalyst is also employed, as shown in Lowell et al. 3,049,522 in combination with a further catalyst promoter, dicyclopentadienyl-iron. When a reducing sulfur-containing compound such as sodium bisulfite is used in this manner, it must be employed in quantities having defined ratios to the oxygen yielding catalysts; thus, it must be present in effective concentrations to carry the polymerization to completion. In each of the foregoing instances, it is necessary also to employ a dispersing agent; in each instance, a water-soluble material such as a polyvinyl alcohol, gelatin, alginates, and the like. In a later application, Lowell, in 3,449,311, uses a water-soluble redox system as extender, consisting of a mixture of sodium formaldehyde sulfoxylate and t-butyl hydroperoxide.

Grim Pat. 2,673,194, describes the suspension polymerization of vinyl aromatic monomers to polymer beads or particles by the use of an oil-soluble oxygen-liberating catalyst, such as benzoyl peroxide, in an aqueous medium with a suspending system which is comprised of finely divided difficultly water-soluble phosphates in the presence of an anionic surface active agent acting as an extender. As used in this art, compounds which act to increase the ability of the phosphate dispersant to stabilize suspensions are termed extenders. As a practical matter, extenders enable the phosphate dispersant to maintain stable suspensions with greater amounts of monomer and/or polymer in the medium than the phosphate can disperse by itself. Among the extenders listed by Grim are dodecylbenzene sodium sulfonate, sodium tetradecyl sulfate, potassium stearate and long chain alkyl sulfonates. The extender is present in amounts of 0.0005–0.05 percent by weight of total suspension.

The foregoing suspension systems produce polymer beads having a broad size range distribution; the individual beads may range in diameter from less than 300 microns to above 2,000 microns with the average bead diameter being dependent upon the amount of suspending agent and extender used, based upon the amount of monomer present. The average bead diameter can be controlled to some extent by varying the parameters of the system such as the ratio of suspending agents to extender or the ratio of suspending agent and extender to monomer. Although the average diameter size is changed through such variations, nevertheless beads will be produced whose size spectrum encompasses the whole range of diameters. Should it be desired to produce beads having a selected average diameter of large size within the range from 300 microns to 2,000 microns the beads produced will include a substantial portion of oversize beads (those that are greater than 2,000 microns in diameter); if the selected average bead diameter is a small size within the range a substantial portion of the beads will be undersized (of less than 300 microns in diameter). In some instances, both oversized and undersized beads will be unavoidably produced. Beads of a diameter outside a selected size range are unsuitable for the use for which the selected range is produced. Fines, being beads of smaller size than the smallest size range of commercially acceptable beads, create, of course, the greatest commercial problem.

Contributions have been made toward solving this problem. For example, efforts have been made to reclaim the off-size beads by extrusion and pelletizing, but such additional steps are expensive. In at least one instance, the use of a selected extender in the aqueous suspension polymerization styrene stabilized by a difficultly soluble phosphate has reduced to a substantial extent the loss of product encountered by the former wide range of sizes so produced. For example, Hohenstein et al. Pat. No. 2,652,392, reduces to some extent this loss occasioned by the production of fines by adding a water-soluble persulfate to the aqueous suspension that is being stabilized by calcium phosphate.

As above mentioned, this problem of off-size beads becomes particularly acute when it is desired to produce beads of small average diameter. The undersize beads are difficult to separate from the larger beads because the small beads acquire a static charge and adhere to the equipment and to the larger beads. This becomes a major commercial problem when beads of a small average diameter, for example 400–500 microns, are produced for use in making expandable polymer beads for molding into thin walled foamed articles such as cups. When the conventional suspending systems are adjusted to produce such small beads commercially large amounts of undersize beads or fines are also produced and these represent a substantial loss in product value.

SUMMARY OF THE INVENTION

It has now been found that suspension polymerization of a vinyl aromatic compound dispersed in an aqueous media containing a difficultly water-soluble phosphate as the dispersant produces polymer beads which have a narrow range of diameter sizes where the polymerization is carried out in the presence of sodium bisulfite as the sole water-soluble suspension regulator. The amount of bisulfite is not particularly critical but it must be added before the polymerization has proceeded to the "bead identity point." During suspension polymerization in a turbulently stirred reactor, the size of the monomer droplets continuously increases during the polymerization of the monomer droplets until a size is reached where the droplets have reached a hardness or repellancy sufficient enough that the droplets no longer coalesce and grow; this is termed the bead identity point and is readily recognized by those working in the art. In a typical example of this invention, the ratio of free radical generating catalyst to bisulfite may be 50 to 1, the ratio of the difficultly water-soluble phosphate dispersant to the bisulfite compound may be greater than 100 to 1, the ratio of the monomer to the dispersant may be 400 to 1, and the monomer to water ratio may be 1 to 1.

DESCRIPTION OF THE DRAWING

The drawing is a bar graph comparing bead size distributions obtained in accordance with the process of this invention and distribution obtained using a conventional polymerization system of tricalcium phosphate and sodium dodecylbenzene sulfonate.

DETAILED DESCRIPTION

The process of the invention is applicable in the suspension polymerization of vinyl aromatic monomers such as styrene, alpha-methyl styrene, mono- and di-chlorostyrene, vinyl naphthalene as well as the copolymerization of vinyl aromatic monomers with such monomers as divinylbenzene, 2-ethylhexyl acrylate, diallyl esters of dibasic aliphatic or aromatic acids, butadiene and polymers capable of further polymerization such as styrene-butadiene, styrene-isoprene, and polybutadiene rubbers.

The finely divided difficulty water-soluble phosphates useful as dispersing agents in the practice of the invention are conventional and are those described, for example, in Grim Pat. 2,673,194. They include those finely divided phosphates difficultly soluble in water, containing for each phosphate group at least three equivalents of a metal the carbonate of which is only slightly soluble in water, e.g., tricalcium phosphate, hydroxyapatite, magnesium phosphate, etc. Advantageously, the amount of phosphate to be employed ranges from about 0.20 to 1.1 percent by weight based on monomer. The average particle size of polymer beads produced in the suspension polymerization depends primarily upon the total amount of phosphate suspending agent; for example, suspensions with larger amounts of phosphate suspending agent yielding beads of a smaller average particle size. The presence of the sodium bisulfite serves to reduce the amount of particles that have sizes larger or smaller than the average particle size.

In accordance with this invention, the sole water-soluble suspension regulator found to be effective is sodium bisulfite. Sodium metabisulfite, when added to water, becomes sodium bisulfite and hence is included in my invention.

The sodium bisulfite is used in amounts of at least about 0.0003 percent by weight based upon the weight of the monomer. About 0.0003 percent by weight of bisulfite is required to produce a stable suspension. The use of such minute amounts is possible because the stabilizing effect of the bisulfite does not appear to be adversely effected by the presence of dirt or other oxidizable impurities in the system. Excessive amounts of bisulfite may cause unstable suspensions and amounts greater than 0.20 percent by weight do not appreciably increase its effect.

The process of the invention may be used with monomer-to-water ratios which vary from 0.3 to 1.5 part by weight monomer per 1.0 part by weight water. The higher monomer-to-water ratios are preferred from an economic standpoint.

The time and temperature cycles for the polymerization may be those conventionally employed. Conveniently, the two stage temperature cycle described in D'Alelio Pat. 2,692,260 is used.

The free radical initiating catalysts which are added to the system are the oil-soluble (and consequently monomer soluble) oxidation catalysts such as organic peroxides for example benzoyl peroxide, t-butyl perbenzoate, lauroyl peroxide. Other free radical producing catalysts that may be used include azobisisobutyronitrile. Conventional amounts of such catalysts are used as, in this invention, the activity does not appear to be influenced by the small amount of bisulfite that is used in accordance with this invention.

The invention is further illustrated by but is not intended to be limited to the following examples wherein parts are parts by weight unless otherwise indicated.

EXAMPLE I

To a reactor equipped with a two-bladed impeller there was added 38 parts of water, 0.120 part of the dispersing agent, tricalcium phosphate, 0.00062 part of sodium bisulfite, 0.15 part of the catalyst comprising 0.125 part of benzoyl peroxide and 0.025 part of t-butyl perbenzoate, and 50 parts of styrene monomer. The suspension was agitated at 60 r.p.m. and heated to 90° C., within a period of 80 minutes. The suspension was maintained at 90° C., for an additional 290 minutes after which an additional 5.2 parts of water were added. The heating was continued at 90° C., for 70 minutes after which the suspension was cooled and acidified with HCl to a pH of about 1.0 to dissolve the phosphate. The beads were separated by centrifuge, washed with water and air dried. The beads were screened into portions. The screen analysis, U.S. Standard Sieve, in percent by weight of polymer beads retained on each size screen, is as follows.

| Screen No.: | Wt. percent polymer retained |
|---|---|
| 10 | 0 |
| 16 | 0.4 |
| 20 | 0.8 |
| 25 | 5.9 |
| 30 | 30.8 |
| 35 | 41.0 |
| 40 | 14.6 |
| 50 | 6.0 |
| Pan | 0.1 |

EXAMPLE II

So that a comparison could be made of the product of the invention with the product made by the use of an extender such as described in Grim Pat. No. 2,673,194, there were added to a reactor equipped with a two-bladed impeller, 42 parts of water containing 0.1316 part of the suspending system consisting of 0.131 part of tricalcium phosphate and 0.0006 part of sodium dodecylbenzene sulfonate (Nacconol NRSF), and 58 parts of styrene monomer having dissolved therein 0.171 part of the catalyst comprising 0.145 part benzoyl peroxide and 0.026 part t-butyl perbenzoate. The suspension was agitated at 68 r.p.m., and heated to 90° C., which took 60 minutes. The suspension was maintained at 90° C., for 365 minutes after which it was cooled and acidified with HCl to a pH of about 1.0 to dissolve the phosphate. The beads were separated by centrifuge, washed with water and air dried. The beads were screened. The screen analysis, U.S. Standard sieve, is as follows.

| Screen No.: | Wt. percent polymer retained |
|---|---|
| 10 | 0.1 |
| 16 | 0.2 |
| 20 | 3.4 |
| 25 | 12.1 |
| 30 | 24.1 |
| 35 | 24.9 |
| 40 | 13.2 |
| 50 | 13.3 |
| Pan | 8.4 |

The screen analyses obtained in Examples I and II are graphically illustrated in the drawing. The polymerization by the method of the invention in the presence of sodium bisulfite produces a bead diameter size range which is extremely narrow. The prime yield of product obtained by the method of the invention was almost 94 percent of monomer charged. The yield of product obtained by using a dodecylbenzene sodium sulfonate extender with the tricalcium phosphate suspension system was, in the desirable particle size, only 77.0 percent weight of monomer charged and the remaining 23 percent by weight, which is undesired material, represents a commercially prohibitive loss of product.

EXAMPLE III

In order to illustrate the effect that varying the amount of the bisulfite that is used has on the size of polymer beads that are produced at a constant concentration of tricalcium phosphate, the following series of polymerizations were carried out using a standard procedure and recipe except that the amount of sodium bisulfite employed was varied as shown in Table I.

To each of a series of 12-ounce Crown cap bottles, were added 100 parts of water containing 0.25 part of the dispersing agent tricalcium phosphate, 0.30 part of catalyst consisting of 0.25 part of benzoyl peroxide and 0.05 part of t-butyl perbenzoate, 100 parts of styrene monomer and the weight percent of sodium bisulfite based on styrene monomer shown in Table I following. The bottles were placed in an oil bath at 90° C., and heated for 7 hours at 90° C., with end-over-end agitation, after which the suspensions were cooled and acidified with HCl to a pH of about 1.0. The beads were separated from the aqueous phase and washed with water by means of a centrifuge. The beads were air dried on trays and screened into portions. The weight percent retained on each screen number is reported in Table I below.

TABLE I.—EFFECT OF BISULFITE CONCENTRATION ON BEAD SIZE WEIGHT PERCENT POLYMER RETAINED ON SCREEN NUMBER

[U.S. Standard Sieve Series]

| Polymerization | Weight percent sodium bisulfite [1] | Screen Number | | | | |
|---|---|---|---|---|---|---|
| | | 10 | 16 | 25 | 40 | Pan |
| I-1 | .0005 | 1.6 | 49.8 | 39.7 | 7.5 | 1.3 |
| I-2 | .0010 | 0.5 | 23.7 | 51.8 | 16.8 | 5.5 |
| I-3 | .0125 | 0.2 | 24.4 | 51.4 | 16.5 | 6.8 |
| I-4 | .0250 | 0.5 | 35.1 | 55.6 | 8.0 | 0.2 |
| I-5 | .0375 | 0.4 | 31.6 | 58.6 | 8.2 | 0.3 |
| I-6 | .100 | 0.6 | 16.0 | 72.3 | 10.6 | 0.5 |
| I-7 | .200 | 0.4 | 15.7 | 70.5 | 13.8 | 0.6 |

[1] Based upon weight of monomer.

It can be seen from the screen analysis that there appears to be no discernible trend of bead size obtained by varying the amount of the bisulfite except that, at relatively low concentrations of bisulfite, it is found that the bead size appears to decrease as the bisulfite concentration increases. The mean bead size produced is, therefore, essentially independent of the amount of bisulfite employed except perhaps when approaching the limits of the useful concentrations. The bead size as is illustrated below depends principally upon the amount of phosphate dispersant that is present when the bisulfite is used. Were the water-soluble bisulfite to influence appreciably the reaction kinetics, a change in bead size could be expected, especially at high bisulfite concentrations, as it is well known that the bead size is influenced by the activity of the catalyst.

EXAMPLE IV

In order to illustrate the effect of the suspending agent concentration on average polymer bead diameter size the following series of polymerizations were carried out using a standard recipe and procedure at two different bisulfite concentrations with the concentration of tricalcium phosphate being varied as is shown in Table II below.

To a two-liter flask equipped with a 45 pitch uplifting two-bladed impeller there were added 750 parts of water containing the percents by weight based on styrene of sodium bisulfite and tricalcium phosphate shown in Table II below, 3.01 parts of catalyst consisting of 1.88 parts of benzoyl peroxide and 1.13 parts of t-butyl perbenzoate, and 750 parts of styrene monomer. The suspension was agitated at 400 r.p.m. and heated to 90° C., which took 90 minutes. The suspension was maintained at 90° C., for 7 hours after which suspension was cooled to room temperature and acidified with HCl to a pH of about 1.0 to dissolve the phosphate. The beads were separated from the aqueous phase and washed with water by means of a centrifuge. The beads were air dried on trays and then screened into portions with the percent by weight of beads retained on each screen number shown in Table II below.

TABLE II.—EFFECT ON BEAD SIZE OF TRICALCIUM PHOSPHATE CONCENTRATION WEIGHT PERCENT POLYMER RETAINED ON SCREEN NUMBER

[U.S. Standard Sieve Series]

| Polymerization | Weight percent | | Screen number | | | | | |
|---|---|---|---|---|---|---|---|---|
| | Tricalcium phosphate on monomer | Sodium bisulfite on monomer | 10 | 16 | 20 | 25 | 40 | Pan |
| II-1 | 0.20 | 0.01 | 3.1 | 46.6 | 37.6 | 8.9 | 3.7 | 0.1 |
| II-2 | 0.30 | 0.01 | 0.2 | 10.0 | 22.6 | 22.2 | 42.2 | 3.1 |
| II-3 | 0.50 | 0.01 | 0.1 | 4.8 | 8.8 | 8.1 | 63.5 | 14.2 |
| II-1A | 0.30 | 0.005 | 0.7 | 18.1 | 32.7 | 21.4 | 25.7 | 1.7 |
| II-2B | 0.40 | 0.005 | 0.6 | 7.9 | 17.4 | 20.9 | 50.3 | 2.3 |
| II-3C | 0.50 | 0.005 | 0.2 | 2.8 | 8.7 | 11.2 | 68.7 | 8.0 |

It can be seen that the average bead size decreases with increasing concentrations of tricalcium phosphate.

EXAMPLE V

To illustrate the effect of catalyst concentration on average bead size, the following series of polymerizations were carried out using a standard recipe and varying the weight percent catalyst based on monomer as shown in Table III below.

To a series of 12-ounce Crown cap bottles, there were added 120 parts of water, 0.24 part of the suspending agent tricalcium phosphate, 0.0050 part of sodium bisulfite and 80 parts of styrene monomer containing 0.04 part of the catalyst t-butyl perbenzoate and the various weight percents, based on monomer, of benzoyl peroxide as shown in Table III below. The bottles were placed in an oil bath at 90° C., and heated for 7 hours at 90° C., with end-over-end agitation. At the end of 7 hours, the bottles were cooled and the beads separated from the aqueous phase, washed with water and air dried on trays. The bead size was visually determined by a comparison to a reference set of graded beads.

TABLE III.—EFFECT OF CATALYST CONCENTRATION ON BEAD SIZE

| Polymerization | Weight percent benzoyl peroxide on monomer | Bead size (visual) |
|---|---|---|
| III-1 | 0.10 | Large (soft). |
| III-2 | 0.15 | Medium. |
| III-3 | 0.20 | Medium-small. |
| III-4 | 0.25 | Do. |
| III-5 | 0.30 | Do. |
| III-6 | 0.35 | Do. |
| III-7 | 0.40 | Small. |
| III-8 | 0.50 | Do. |

From the size analysis reported in Table III above it can be seen that as the amount of catalyst was increased the bead size tended to decrease. This is as to be expected since the beads tend to grow during polymerization until about 35–40 percent conversion of monomer to polymer and using the larger amounts of catalyst causes the polymerization to reach this conversion point more rapidly and therefore the beads have less opportunity to grow in size before the bead identity point is reached.

EXAMPLE VI

In order to illustrate the effect of monomer to water ratio on bead shape and size, the following series of polymerizations were carried out using a standard recipe except that the styrene-to-water ratio was varied as shown in Table IV below.

To each of a series of 12-ounce Crown cap bottles, there were added the varying parts of styrene and water shown in Table IV below, an amount of tricalcium phosphate as shown in Table IV sufficient to give a 0.15 percent by weight suspending agent concentration based on styrene, an amount as shown in Table IV of sodium bisulfite sufficient to give an 0.0040 percent by weight bisulfite concentration based on styrene monomer, and 0.30 percent by weight based on styrene of catalyst consisting of 0.25 percent by weight benzoyl peroxide and 0.05 percent by weight t-butyl perbenzoate. The bottles were placed in a polymerizer and rotated end-over-end for 7 hours at an oil bath temperature of 90° C. At the end of 7 hours the bottles were cooled and acidified with HCl to a pH of about 1.0 to dissolve the phosphate. The beads were separated from the aqueous phase, washed with water, air dried on trays. The particle size from each polymerization was visually estimated by comparison of the beads with a reference set of graded beads. The results of the estimate are recorded in Table IV below.

TABLE IV.—EFFECT OF MONOMER-TO-WATER RATIO ON BEAD SIZE

| | Parts | | | Parts | | Particle | |
|---|---|---|---|---|---|---|---|
| Polymerization | Styrene | Water | Styrene: water | TCP | Na bisulfite | Size [1] | Shape |
| IV-1 | 80 | 120 | 40:60 | 0.120 | 0.0032 | 8 | Beads. |
| IV-2 | 90 | 110 | 45:55 | 0.135 | 0.0036 | 12 | Do. |
| IV-3 | 100 | 100 | 50:50 | 0.150 | 0.0040 | 14 | Do. |
| IV-4 | 110 | 90 | 55:45 | 0.165 | 0.0044 | 14 | Do. |
| IV-5 | 120 | 80 | 60:40 | 0.180 | 0.0048 | 12 | Disks. |
| IV-6 | 130 | 70 | 65:35 | 0.195 | 0.0052 | 10 | Elongated disks. |

[1] Visual comparison with a reference set of graded beads.

It can be seen that the only apparent effect of varying the styrene-to-water ratio on bead size is that at high monomer concentrations flat particles are produced which indicates that the system tends to become less stable at the very high monomer concentrations. It has also been noted that better reproducibility of mean bead size occurs at the lower monomer-to-water ratios.

EXAMPLE VII

To illustrate the effect on average bead size of the time of addition of the bisulfite to the suspension, the following series of polymerizations were carried out using a standard recipe and procedure except that the sodium bisulfite was added at various times, both prior to the start of polymerization and during polymerization.

To a 2-liter flask equipped with a 45° pitch uplifting, two-bladed impeller there were added 712.5 parts of water containing 3 parts of tricalcium phosphate, 3.01 parts of the catalyst consisting of 1.8 parts benzoyl peroxide and 1.13 parts of t-butyl perbenzoate, and 750 parts of styrene monomer. The suspension was agitated at 400 r.p.m. and sodium bisulfite, .0375 part by weight, was added to the suspension in the form of 37.5 milliliters of an 0.1 percent aqueous solution of sodium bisulfite at the time or temperature indicated in Table V below. The polymerization was maintained for 7 hours at 90° C., except for polymerization No. V-10 which failed about 4 hours at 90° C. After the suspension had been maintained at 90° C., for the 7 hours, the suspension was cooled and acidified with HCl to a pH of about 1.0 to dissolve the phosphate. The beads were separated from the aqueous phase and washed with water by means of a centrifuge. The beads from each polymerization were air dried on trays and then screened into portions. The results of the screen analysis are set forth in Table V below.

TABLE V.—EFFECT ON BEAD SIZE OF TIME OF ADDITION OF THE BISULFITE

| | | Temperature (° C.) | Percent by weight of polymer retained on screen No. (U.S. Standard Sieve Series) | | | | | |
|---|---|---|---|---|---|---|---|---|
| | Time (min.) | | 10 | 16 | 20 | 25 | 40 | Pan |
| Polymerization: | | | | | | | | |
| V-1 | Premix, 150 | ([1]) | 0.4 | 6.6 | 10.5 | 7.7 | 52.3 | 23.0 |
| V-2 | Premix, 90 | ([1]) | Nil | 6.3 | 16.9 | 12.3 | 48.8 | 15.6 |
| V-3 | Premix, 30 | ([1]) | 0.4 | 2.8 | 13.8 | 17.4 | 58.3 | 6.9 |
| V-4 | 0 | ([1]) | Nil | 5.8 | 12.5 | 12.9 | 60.2 | 7.7 |
| V-5 | Heat-up— | 45 | Nil | 3.5 | 12.0 | 12.8 | 60.9 | 10.7 |
| V-6 | Heat-up— | 80 | Nil | 1.4 | 6.1 | 7.7 | 60.6 | 23.7 |
| V-7 | At 90° C.: | | | | | | | |
| | 0 | 90 | Nil | 1.9 | 10.6 | 14.2 | 63.8 | 9.2 |
| V-8 | 60 | 90 | 0.4 | 11.5 | 13.6 | 11.0 | 46.5 | 16.1 |
| V-9 | 120 | 90 | 1.0 | 45.0 | 28.9 | 9.3 | 11.6 | 3.1 |
| V-10 | 180 | 90 | Lost dispersion | | | | | |

[1] Room temperature.

No appreciable effect on average bead size was found by adding the bisulfite as much as 2½ hours prior to the start-up of polymerization up until the time that polymerization had reached 90° C. However, it can be seen that by delaying the bisulfite addition beyond about an hour at 90° C., the average bead size was greatly increased which is an indication of a less stable suspension system and, in fact, the suspension failed when the addition was delayed for 3 hours at 90° C., for at this time, the polymerization had passed beyond the bead identity point. For example, in an analogous suspension polymerization was carried out with a free radical producing agent comprised of 0.2 part of benzoyl peroxide and 0.1 part of t-butyl perbenzoate at a temperature of 100° and making periodic analysis of the conversion of the monomer to polymer, it was found that the polymerization was proceeded along the following schedule:

| Time, hrs.: | Temperature, °C. | Percent monomer converted |
| --- | --- | --- |
| 0 | (1) | 0.1 |
| 0.5 | 62 | 0.3 |
| 0.5 | 100 | 8.0 |
| 1.0 | 100 | 38.0 |
| 2.0 | 100 | 52.0 |
| 3.0 | 100 | 60.0 |
| 4.0 | 100 | 67.0 |
| 4.5 | 100 | 75.0 |

[1] Room temperature.

Thus, it can be seen that, after one hour of polymerization, the beads have approached the bead identity stage [1] and control of the bead size is not affected by the addition of the bisulfite.

EXAMPLE VIII

To a two-liter flask equipped with a 45° pitch uplifting impeller there were added 750 parts of water, 0.0046 percent by weight, based on styrene monomer, of sodium metabisulfite, 0.4 percent by weight of tricalcium phosphate, 3.01 parts of catalyst comprising 1.88 parts of benzoyl peroxide and 1.13 parts of t-butyl perbenzoate, and 750 parts of styrene monomer. The suspension was agitated at 400 r.p.m. and heated to 90° C., which took 80 minutes. The suspension was maintained at 90° C., for 7 hours after which the suspension was cooled and acidified with HCl to a pH of about 1.0 to dissolve the phosphate. The beads were separated from the aqueous phase and washed with water by means of a centrifuge. The beads were air dried on trays and then screened into portions with the following results.

| Screen No.: | Wt. percent polymer retained |
| --- | --- |
| 10 | 1.5 |
| 16 | 6.8 |
| 20 | 15.6 |
| 25 | 17.6 |
| 40 | 53.5 |
| Pan | 5.0 |

[1] About 35%–40% conversion.

EXAMPLE IX

To demonstrate the advantage of the use of sodium bisulfite, as sole water-soluble suspension regulator, in contrast to the use of an extender mixture comprising a mixture of water-soluble components which regulate or adjust the suspension system, the method of Example III was repeated substituting a mixture of sodium formaldehyde sulfoxylate and t-butyl hydroperoxide as suggested by Lowell, U.S. 3,449,311 for the sodium bisulfite of this invention.

To each of a series of 12-ounce Crown cap bottles, were added 100 parts of water containing 0.30 part of catalyst consisting of 0.25 part of benzoyl peroxide and 0.05 part of t-butyl perbenzoate, 100 parts of styrene monomer, and the amounts of the dispersing agent tricalcium phosphate and the regulators, sodium bisulfite or the mixture of t-butyl hydroperoxide and sodium formaldehyde sulfoxylate as indicated in Table VI below. The bottles were placed in an oil bath at 90° C., and heated for 7 hours at 90° C., with end-over-end agitation, after which the suspensions were cooled and acidified with HCl to a pH of about 1.0. The beads were separated from the aqueous phase and washed with water by means of a centrifuge. The beads were air dried on trays and screened into portions. The weight percent retained on each screen number is reported in Table VI below.

TABLE VI

| Polymerization | Weight percent regulator ||||  Weight percent polymer retained on screen number |||||||
| | Parts phosphate per 100 styrene | NaHSO₃ | t-Butyl hydroperoxide | Na formaldehyde sulfoxylate | 10 | 14 | 20 | 30 | 40 | 50 | Pan |
| --- | --- | --- | --- | --- | --- | --- | --- | --- | --- | --- | --- |
| VI-1 | 0.25 | 0.0030 | | | 0.4 | 4.2 | 59.4 | 26.8 | 6.4 | 1.8 | 0.4 |
| VI-2 | 0.50 | 0.0060 | | | 0.2 | 0.6 | 6.5 | 34.6 | 37.3 | 15.5 | 3.8 |
| VI-3 | 0.25 | | 0.0025 | 0.0060 | [1] 79.4 | [1] 18.2 | [1] 1.6 | 0.1 | | | |
| VI-4 | 0.50 | | 0.0050 | 0.0120 | [1] 1.7 | [1] 25.1 | [1] 67.9 | 3.7 | 0.4 | 0.1 | |

[1] Beads were flat, rice-like particles rather than spherical.

It can be seen from the data in Table VI that the use of the redox system of Lowell as the water-soluble extender gave average particle size much larger than that obtained using the bisulfite as the sole water-soluble suspension regulator. Further, the beads resulting from the use of the sulfoxylate-hydroperoxide system were not spherical, but were rather flat, rice-like shaped. These irregularly shaped particles are undesirable because they tend to clog the hopper leading to the pre-expanding equipment. Further, assuming they are induced to enter the equipment without clogging, they expand to irregular shapes and are not easily packed into the final mold with sufficient density to form void-free articles after final expansion. Spherical particles, on the other hand, flow freely into both pre-expander and final mold, forming close-packed arrangements which closely follow the contours of the mold to form void-free articles.

EXAMPLE X

To demonstrate the use of the process of the invention to produce styrene copolymers, particularly a copolymer having a lower softening point than styrene homopolymer, the following polymerization was carried out. To a reactor equipped with a two-bladed impeller there were added 73 parts of water, 0.125 part of the suspending agent tricalcium phosphate, 0.00125 part sodium bisulfide, along with 0.40 part of the catalyst comprising 0.25 part benzoyl peroxide and 0.15 part of t-butyl perbenzoate and 100 parts of monomer comprising 95 parts of styrene and 5 parts of 2-ethylhexyl acrylate. The suspension was agitated at 100 r.p.m. and heated to 90° C., which took 75 minutes. An additional 12.5 parts of water was added after 330 minutes at 90° C. The suspension was maintained at 90° C., for an additional 30 minutes after which it was cooled and acidified with HCl to a pH of about 1.0 to dissolve the phosphate. The beads were separated by centrifuge, washed with water and air dried. The beads were screened to size and the screen analysis from a U.S. Standard sieve is as follows.

| Screen No.: | Wt. percent polymer retained |
| --- | --- |
| 10 | 0.5 |
| 16 | 2.0 |
| 20 | 61.3 |
| 25 | 29.2 |
| 40 | 6.9 |
| 50 | 0.1 |
| Pan | --- |

EXAMPLE XI

The following two polymerizations were carried out in order to demonstrate the advantage of using sodium bisulfite, when compared with an extender of the prior art, sodium dodecylbenzene sulfonate, in yielding a product having superior color and better clarity.

To a reactor equipped with a two-bladed impeller there were added 73 parts of water, 0.25 part of the suspending agent tricalcium phosphate and either 0.0007 part of sodium bisulfite or 0.0007 part of sodium dodecylbenzene sulfonate (Nacconol NRSF), 0.30 part of the catalyst consisting of 0.25 part of benzoyl peroxide and 0.05 part of t-butyl perbenzoate and 100 parts of styrene monomer. The reactor was agitated at 75 r.p.m. and heated to 90° C., which took 30 minutes. After 5 hours at 90° C., an additional 6.1 parts of water were added. The suspension was heated for an additional hour at 90° C., after which it was cooled and acidified with HCl to a pH of 1.0 to dissolve the phosphate. The beads were separated from the aqueous phase and washed with water by means of a centrifuge and air dried.

Portions of beads from each of the two polymerizations were molded into bars having the dimensions ½″ x ½″ x 5″. The Hazen color was determined for the bars. Briefly, the procedure involves immersing the test bar in 125 ml. of water such that its long dimension is vertical and introducing into the water a standard platinum cobalt chloride color solution until the bar and the solution when observed from above had the same color. The Hazen value is then calculated using the formula $$\frac{cc\text{'s of color solution used}}{\text{volume of water} + cc\text{'s of color solution used}} \times \text{Hazen value of color solution}$$

The results are reported in Table VII below.

The clarity of the bars was determined by visually examining the bars under a fluorescent light for transparency and the presence of any streaks or cloudiness in the plastic. A clarity value of 1 is assigned to a plastic bar which is substantially transparent and free from streaks. High clarity values are assigned to bars which are not transparent, i.e., 2, 3, etc.

TABLE VII

| Additive | Color | Clarity |
| --- | --- | --- |
| Nacconol (NRSF) | 13 | 1 |
| Sodium bisulfite | 8 | <1 |

It can be seen that the plastic bar molded from polymers prepared using sodium bisulfite had less color than that molded from polymer prepared using Nacconol (NRSF) in the process. When a side-by-side comparison was made of the polymer prepared by each process, the polymer prepared using sodium bisulfite in the process appeared to have superior clarity.

EXAMPLE XII

In order to illustrate the specific action of the bisulfite, the following polymerization was carried out in which sodium bisulfate was substituted in the polymerization system for the bisulfite of the invention.

To a two-liter flask equipped with a 45° pitch uplifting impeller there were added 750 parts of water, 0.25 part of the suspending agent tricalcium phosphate, 0.0428 part of sodium bisulfate, 3.01 parts of catalyst comprising 1.88 parts of benzoyl peroxide and 1.13 parts of t-butyl perbenzoate, and 750 parts of styrene monomer. The suspension was agitated at 400 r.p.m. and heated to 90° C., which took 90 minutes. The suspension was maintained at 90° C., for 3 hours after which the suspension failed. The mixture of monomer and polymer separated into a single separate phase and formed a lump around the stirrer.

EXAMPLE XIII

To a 12-ounce Crown cap bottle were added 100 parts of water, 0.25 part of the suspending agent, tricalcium phosphate, 0.003 part of sodium bisulfite, 0.20 part of the catalyst, azobisisobutyronitrile, and 100 parts of the monomer, styrene. The bottle was capped and rotated end-over-end in an oil bath at 80° C., for ten hours. The suspension was cooled and acidified with HCl to a pH of about 1.0 to dissolve the phasphate. The beads were separated from the aqueous phase, washed with water and air dried. A visual comparison of the beads with a reference set of graded beads showed that were predominantly between 16 and 25 mesh, U.S. Standard sieve.

The above example illustrates the process of the invention using a free radical producing catalyst other than a peroxide.

What is claimed is:

1. In a process for producing polymer beads having a narrow range of diameter sizes by suspending a vinyl aromatic monomer containing from 0.15 to 0.55 percent by weight based on monomer of a monomer-soluble free radical producing catalyst in an aqueous medium, such that the monomer-to-water ratio is from about 0.3–1.5 parts by weight monomer per 1.0 part by weight water, with the aid of from about 0.10 to 0.5 percent by weight based on monomer of a finely divided difficultly water-soluble phosphate suspending agent and subjecting the suspension to an elevated temperature to cause said monomer to polymerize, the improvement which comprises adding to said suspension at least about 0.0003 to 0.20 percent by weight, based on monomer, of a water-soluble suspension regulator consisting of sodium bisulfite before the monomer has polymerized to the bead identity point.

2. A process for producing polymer beads comprising suspending a vinyl aromatic monomer having from 0.15 to 0.55 percent by weight based on monomer of a free-radical producing catalyst dissolved in the monomer in an aqueous medium as droplets, such that the monomer-to-water ratio is from about 0.3–1.5 parts by weight monomer per 1.0 part by weight water with the aid of a finely divided phosphate suspending agent that is difficultly soluble in water and that contains at least three equivalents of a metal for each phosphate group, said phosphate being present in an amount from about 0.10–0.5 percent by weight based on monomer, adding as the sole water-soluble suspension regulator, at least about 0.0003 to 0.20 percent by weight, based on monomer, of sodium bisulfite, and heating said suspension to an elevated temperature to polymerize said monomer into polymer beads having a narrow range of diameter sizes.

3. The process of claim 1 wherein the suspension regulator is added to the suspension before about 40% of the monomer has polymerized.

4. A process for producing polymer beads having a narrow range of diameter sizes comprising suspending styrene monomer containing from 0.15 to 0.55 percent by weight based on monomer of an oil-soluble oxidizing catalyst in an aqueous medium, such that the styreneto-water ratio is from about 0.3–1.5 parts by weight monomer per 1.0 part by weight water, with the aid of finely divided tricalcium phosphate, said phosphate being present in an amount from about 0.10–0.5 percent by weight based on monomer, adding as the sole water-soluble suspension regulator from about 0.0003 to 0.20 percent by weight sodium bisulfite based on monomer to the suspension, agitating said suspension and heating the suspension to decompose the catalysts to free-radicals to cause said monomer to polymerize.

References Cited

UNITED STATES PATENTS 3,449,311  6/1969  Lowell _____ 260—93.5

JAMES A. SEIDLECK, Primary Examiner

U.S. Cl. X.R.

260—78.5 UA, 84.3 R, 86.7 R, 88.2 C, 91.5 R, 880 R